(12) United States Patent
Nishikawa et al.

(10) Patent No.: US 7,190,538 B2
(45) Date of Patent: Mar. 13, 2007

(54) MASTER CARRIER FOR MAGNETIC TRANSFER, INSPECTING METHOD THEREOF, AND MAGNETIC RECORDING MEDIUM PRODUCING METHOD

(75) Inventors: Masakazu Nishikawa, Kanagawa (JP); Naoto Fujiwara, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 11/366,404

(22) Filed: Mar. 3, 2006

(65) Prior Publication Data

US 2006/0204790 A1 Sep. 14, 2006

Related U.S. Application Data

(62) Division of application No. 10/893,927, filed on Jul. 20, 2004, now Pat. No. 7,094,484.

(30) Foreign Application Priority Data

Jul. 22, 2003 (JP) .................. P. 2003-277561

(51) Int. Cl.
*G11B 5/02* (2006.01)
*G11B 3/70* (2006.01)
*B28B 7/38* (2006.01)

(52) U.S. Cl. .................. 360/17; 360/135; 369/280; 427/130

(58) Field of Classification Search .................. 360/15, 360/16, 17, 31, 135; 427/127, 128, 130; 428/831.2, 836, 846, 848.4, 848, 64.2; 72/779; 702/97; 369/272.1, 280
See application file for complete search history.

(56) References Cited

U.S. PATENT DOCUMENTS

| | | | | |
|---|---|---|---|---|
| 5,202,810 A | * | 4/1993 | Nakamura et al. | 427/128 |
| 6,347,016 B1 | | 2/2002 | Ishida et al. | |
| 6,819,511 B2 | * | 11/2004 | Nishikawa | 360/17 |
| 6,833,969 B2 | * | 12/2004 | Usa et al. | 360/17 |
| 6,850,377 B2 | * | 2/2005 | Hashi et al. | 360/17 |
| 6,858,329 B2 | * | 2/2005 | Hamada et al. | 428/848 |
| 6,887,593 B2 | * | 5/2005 | Sugita et al. | 428/692.1 |
| 6,909,563 B2 | * | 6/2005 | Nishikawa et al. | 360/16 |
| 6,954,317 B2 | * | 10/2005 | Aoki et al. | 360/17 |

FOREIGN PATENT DOCUMENTS

JP      10-40544 A      2/1998

OTHER PUBLICATIONS

Translation JA 10-40544.*

* cited by examiner

*Primary Examiner*—Carol Chaney
*Assistant Examiner*—Louis de Falasco
(74) *Attorney, Agent, or Firm*—Sughrue Mion, PLLC

(57) ABSTRACT

In a master carrier for magnetic transfer which comprises a support that has a transfer-recording pattern arrayed in the track direction thereof in accordance with the information to be transferred to a magnetic recording medium, and a magnetic layer formed on the transfer-recording pattern of the support, the in-plane distance L (mm) between the hill and the valley of the warped master carrier, the vertical-direction distance H (μm) between the two, and the thickness d (mm) of the master carrier are so defined that they satisfy a relation of $0.05 \leq H \cdot d^3 / L \leq 0.6$.

8 Claims, 4 Drawing Sheets

MASTER CARRIER FOR MAGNETIC TRANSFER, INSPECTING METHOD THEREOF, AND MAGNETIC RECORDING MEDIUM PRODUCING METHOD

This is a divisional of application Ser. No. 10/893,927 filed Jul. 20, 2004 now U.S. Pat. No. 7,094,484. The entire disclosure of the prior application, application Ser. No. 10/893,927 is hereby incorporated by reference.

BACKGROUND OF THE INVENTION

1. Field of the Invention

The present invention relates to a master carrier for magnetic transfer, which has a transfer-recording pattern arrayed in the track direction thereof in accordance with the information to be transferred to a magnetic recording medium, to an inspection method for it, and to a method for producing magnetic recording media by the use of it.

2. Description of the Related Art

Hard discs and high-density flexible discs that are desired to satisfy the requirements of mass storage and rapid access are supported by a tracking servo technique by which a magnetic head accurately scans and traces a narrow track width to reproduce signals at a high S/N ratio. According to the tracking servo technique, tracking servo signals, address information signals, regeneration clock signals and others are preformatted at predetermined intervals in one circle of every disc.

A magnetic head reads the preformatted signals on a disc and corrects its own position, and therefore it can accurately run along a predetermined track on the disc. Heretofore, discs are preformatted one by one or for every one track by the use of a dedicated servo-write device. However, such a servo-write device is expensive, and it takes a long period of time to preformat discs with it. Therefore, the servo-writing step accounts for the major part of the production costs of preformatted discs, and it is desired to reduce the costs thereof.

In that situation, a magnetic transfer method has been proposed in place of the method of preformatting one by one track on every disc, and it comprises transferring the necessary magnetic information all at a time. Precisely, the magnetic transfer method comprises keeping the surface of a magnetic recording medium (slave medium) that has a magnetic recording region in its surface, in intimate contact with the surface of a master carrier that has an uneven pattern on the surface of a support having a magnetic material in accordance with transfer information, and applying a transfer magnetic field to these in that condition to thereby transfer the magnetic pattern that corresponds to the information (servo signal) carried by the master carrier, into the magnetic recording region of the slave medium. The magnetic transfer method attains the necessary recording not requiring a relative position change of the master carrier and the slave medium, and it enables accurate preformatting of discs within an extremely short period of time. As a background of the invention, there is a reference of U.S. Pat. No. 6,347,016.

However, in order to improve the transfer quality in the above-mentioned magnetic transfer method, there is an important problem of how to keep the master carrier and the slave medium in intimate contact with each other with no clearance gap therebetween. This is because, if the two aren't kept enough in contact with each other therebetween, then a satisfactory recording signal intensity cannot be obtained and the intended magnetic transfer may not be attained in some region. The magnetic transfer failure causes signal drop of the magnetic information transferred to the slave medium, and the transferred signal quality is thereby lowered, and when the recorded signal is a servo signal, then it could not satisfactorily attain its tracking function and the signal-reading reliability thereof may therefore lower. To that effect, uniform signal recording in all over the disc area is important in the art of magnetic transfer.

We carried out a magnetic transfer test of recording a large number of slave medium sheets from one and the same master carrier, and inspected the signals recorded on the slave medium sheets. As a result, we found that signal drop occurred in the region of an order of $mm^2$ with the increase in the transfer repetitions, and the master carrier with a trouble of significant signal drop finally failed in signal recording. Given that situation, we inspected the outward appearance of the master carrier before and after used in the test, and found some slight change in the appearance of the master carrier with a trouble of signal drop.

In addition, we have analyzed the profile of the used master carrier, and, as a result, found some minor change in the profile of the master carrier before and after used in the magnetic transfer test. From these, we considered that the large pressure applied to the master carrier in intimately contacting it with the slave medium caused the deformation of the master carrier. Accordingly, we again tried the magnetic transfer under a reduced pressure, but failed to ensure the intimate contact condition between the master carrier and the slave medium and, as a result, we could not realize uniform signal recording on the slave medium. Specifically, this suggests the presence of a factor that may augment the carrier deformation in addition to the pressure to be applied to the carrier in intimately contacting it with a recording medium. We carried out the same test in which the thickness of the master carrier was reduced to thereby lower the macromechanical bending toughness thereof, and found that the contact pressure necessary for ensuring the uniform intimate contact between the master carrier and the recording medium did not differ so much between the thick master carrier and the thin master carrier.

SUMMARY OF THE INVENTION

The present invention has been made in consideration of the above-mentioned situation, and its object is to provide a master carrier for magnetic transfer, which can be uniformly and intimately contacted with a slave medium and which is prevented from being deteriorated owing to contact pressure-dependent deformation thereof, to provide an inspection method for it, and to provide a process of producing a preformatted magnetic recording medium by the use of it, therefore improving the magnetic transfer quality in magnetic recording and realizing uniform signal recording in the entire surface of discs.

A first aspect of the invention is to provide a master carrier for magnetic transfer, which comprises a support that has a transfer-recording pattern arrayed in a track direction thereof in accordance with information to be transferred onto a magnetic recording medium, and a magnetic layer on the transfer-recording pattern of the support, and which is characterized in that an in-plane distance L (mm) between a hill and a valley of the warped master carrier, a vertical-direction distance H (μm) between the two, and a thickness d (mm) of the master carrier satisfy a relation of $0.05 \leq H \cdot d^3 / L \leq 0.6$.

Based on the knowledge that the microscopic deformation of a master carrier, before it has received a pressure for its intimate contact with a recording medium, may be augmented by pressure application thereto, the master carrier for magnetic transfer of the invention is specifically so designed that the initial warp existing in the plane thereof may fall within a predetermined range ($0.05 \leq H \cdot d^3/L \leq 0.6$), and its deformation to be augmented dependently on pressure application to it is thereby retarded. As a result, the master carrier is deformed little even under pressure, and therefore can maintain its uniform and intimate contact with a slave medium under pressure, and the contact pressure-dependent deformation of the master carrier is retarded. Accordingly, the master carrier of the invention realizes improved magnetic transfer quality and uniform signal recording in the entire area of discs.

Preferably, the master carrier for magnetic transfer of the invention, wherein the support to form a transfer-recording pattern comprises a metal.

Since the support to form a transfer-recording pattern comprises a metal in the master carrier, various metal film-forming methods including electroless plating, electroplating, sputtering and ion-plating may be applied to it.

A second aspect of the invention is a method for inspecting a master carrier for magnetic transfer that comprises a support having a transfer-recording pattern arrayed in a track direction thereof in accordance with information to be transferred onto a magnetic recording medium, and a magnetic layer on the transfer-recording pattern of the support, and the method comprises measuring the in-plane distance between the hill and the valley of the warped master carrier and the vertical-direction distance between the two, and judging whether the master carrier is good or not based on the relation between the thickness of the master carrier and the in-plane distance and the vertical-direction distance measured previously.

According to the inspection method for master carriers of the invention, master carriers are judged whether they are good or not on the basis of evaluation factors of the in-plane distance between the hill and the valley of the warped master carrier, the vertical-direction distance between the two, and the thickness of the master carrier. In the method, therefore, the warp formed in master carriers can be accurately detected and master carriers can be therefore accurately judged whether they are good or not.

Preferably, the inspection method for master carriers is characterized by judging whether the master carrier is good or not based on whether or not the in-plane distance L (mm) between the hill and the valley of the warped master carrier, the vertical-direction distance H (μm) between the two, and the thickness d (mm) of the master carrier satisfy a relation of $0.05 \leq H \cdot d^3/L \leq 0.6$.

According to the inspection method for master carriers, whether the master carrier is good or not is judged based on whether or not the initial warp existing in the plane of the master carrier falls within a predetermined range ($0.05 \leq H \cdot d^3/L \leq 0.6$). In the method, therefore, it is possible to accurately detect the warp in the plane of the master carrier for preventing the deformation of the master carrier that may be augmented dependently on the contact pressure applied thereto.

Preferably, the master carrier is rotated around its center axis, an optical length-measuring unit disposed opposite to the face of the master carrier is moved in the radial direction of the master carrier while kept in parallel to the face of the mater carrier, to thereby measure the vertical height of the measuring unit from the face of the master carrier, and the in-plane distance between the hill and the valley of the warped master carrier and the vertical-direction distance between the two are derived from a vertical height distribution of a measuring unit from the master carrier.

The rotating mechanism of the master carrier and the linear-moving mechanism of the optical length-measuring unit are driven to measure the in-plane distance and the vertical-direction distance of the warp existing in the master carrier, and the overall surface of the master carrier can be traced by such simple mechanisms. Accordingly, the invention enables rapid and accurate detection of the deformation of master carriers by the use of inexpensive devices.

A third aspect of the invention is to provide a process of producing a preformatted magnetic recording medium, which comprises the steps of: preparing a master carrier for magnetic transfer, preparing a slave medium comprising a non-magnetic support having a magnetic recording layer thereon, initially magnetizing the magnetic recording layer of the slave medium to a predetermined direction, bringing a surface of the master medium into intimate contact with the magnetic recording layer of the slave medium at a predetermined pressure to form a conjoined body, and applying a transfer magnetic field to the conjoined body in a direction opposite to the predetermined direction, thereby obtaining the magnetic recording medium having the recorded data, wherein the master carrier comprises a disk surface having a hill and a valley, which result from a warp of the master carrier; the master carrier has an in-plane distance L (mm) between the hill and the valley with respect to the disk surface, a vertical-direction distance H (μm) between the hill and the valley with respect to the disk surface, and a thickness d (mm); and the in-plane distance L (mm), the vertical-direction distance H (μm), and the thickness d (mm) satisfy the following formula:

$$0.05 \leq H \cdot d^3/L \leq 0.6$$

According to the invention, the master carrier to be used in magnetically recording is specifically so designed that the initial warp existing in its plane falls within a predetermined range ($0.05 \leq H \cdot d^3/L \leq 0.6$), and therefore the deformation of the master carrier that may be augmented dependently on the contact pressure applied thereto may be retarded, and, as a result, the master carrier can be uniformly and intimately contacted with the magnetic transfer medium. According to the process, therefore, a magnetic recording medium uniformly recorded thereon can be obtained.

The master carrier for magnetic transfer of the invention is specifically so designed that the in-plane distance L (mm) between the hill and the valley of the warped master carrier, the vertical-direction distance H (μm) between the two, and the thickness d (mm) of the master carrier satisfy a relation of $0.05 \leq H \cdot d^3/L \leq 0.6$, and it ensures uniform intimate contact with a magnetic recording medium. Based on the knowledge that the microscopic initial deformation of a master carrier, before it has received a contact pressure applied thereto, may be augmented by pressure application thereto, the master carrier is so designed that the initial warp existing in the plane thereof may fall within a predetermined range ($0.05 \leq H \cdot d^3/L \leq 0.6$), and its deformation to be augmented dependently on pressure application to it is thereby retarded. As a result, the master carrier is deformed little even under pressure, and therefore can be uniformly intimately contacted with a number of magnetic recording media separately applied thereto, and the contact pressure-dependent deformation of the master carrier is retarded. Accordingly, the master carrier of the invention realizes long-term stable, improved magnetic transfer quality and uniform signal recording in the entire area of discs.

According to the inspection method for master carriers of the invention, master carriers are judged whether they are good or not on the basis of evaluation factors of the in-plane distance between the hill and the valley of the warped master carrier, the vertical-direction distance between the two, and the thickness of the master carrier. In the method, therefore, the warp existed in master carriers can be accurately detected and master carriers can be therefore accurately judged whether they are good or not. Preferably, the master carrier is rotated around its center axis, an optical length-measuring unit disposed opposite to the face of the master carrier is moved in the radial direction of the master carrier while kept in parallel to the face of the mater carrier, to thereby measure the vertical height of the measuring unit from the face of the master carrier, and the in-plane distance between the hill and the valley of the warped master carrier and the vertical-direction distance between the two are derived from the vertical height distribution of the measuring unit from the master carrier. In this embodiment, therefore, the overall surface of the master carrier can be traced by such simple mechanisms. Accordingly, the process enables rapid and accurate detection of the deformation of master carriers by the use of inexpensive devices.

In the process of producing a preformatted magnetic recording medium, the master carrier of the invention is used to prepare a sub-master carrier for magnetic transfer, and the sub-master carrier is used in magnetically recording servo signals on a magnetic recording medium. In this process, the initial warp existing in the plane of the master carrier is controlled to fall within a predetermined range ($0.05 \leq H \cdot d^3 / L \leq 0.6$), and therefore the deformation of the master carrier that may be augmented dependently on the contact pressure applied thereto may be retarded, and, as a result, the master carrier can be uniformly and intimately contacted with the magnetic transfer medium. According to the process, therefore, a magnetic recording medium uniformly recorded thereon can be obtained.

DETAILED DESCRIPTION OF THE INVENTION

Preferred embodiments of the master carrier for magnetic transfer of the invention, the inspection method for it, and the method for producing magnetic recording media by the use of it are described hereinunder with reference to the drawings attached hereto.

Figure 1:
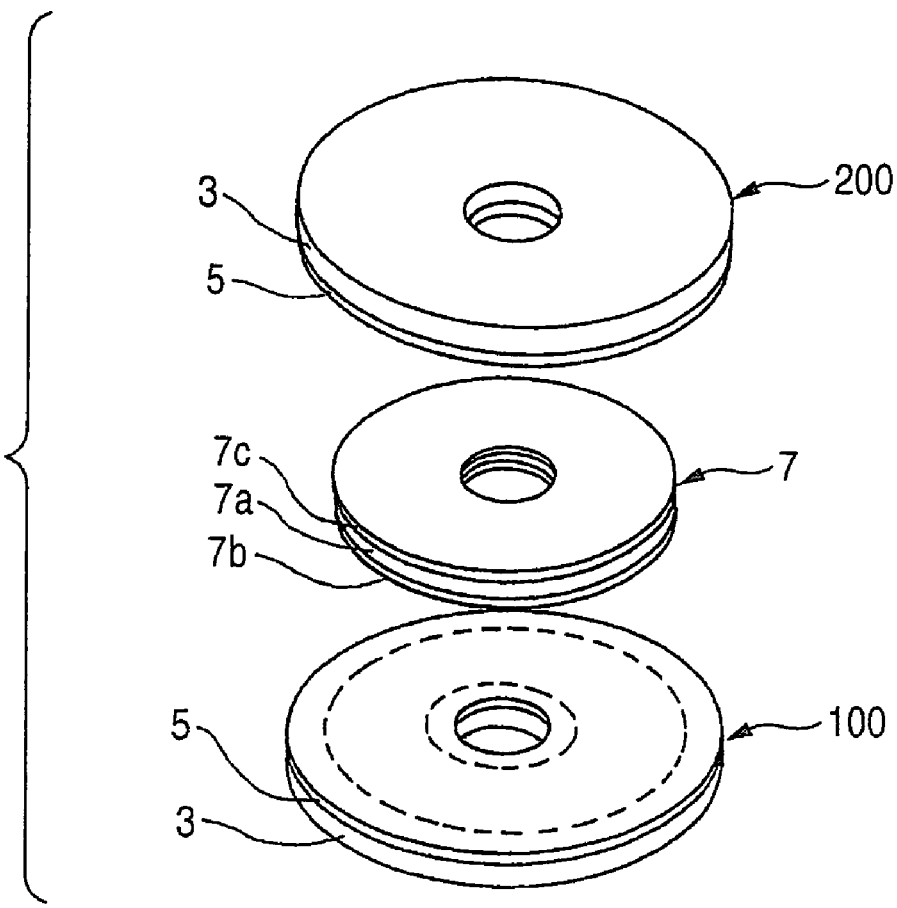
FIG. 1 is perspective views of a master carrier for magnetic transfer of the invention and a slave medium that accepts magnetic transfer from the master carrier.

FIG. 1 is perspective views of a master carrier for magnetic transfer of the invention and a slave medium that accepts magnetic transfer from the master carrier; FIG. 2 is explanatory views that show a basic process of magnetic transfer to a magnetic recording medium; FIG. 3 is an explanatory view schematically showing a method for analyzing the profile of a master carrier.

One embodiment of the master carrier for magnetic transfer of the invention is a master carrier for preformatting in-plane magnetic recording media, and this is described below.

As in FIG. 1 and FIG. 2, the master carrier 100 is formed like a disc, and this comprises a support 3 having an uneven pattern (magnetic transfer pattern) with patterned protrusion portion 1 formed in the surface thereof, and a soft magnetic layer 5 formed on the uneven pattern of the support. The depression portion of the uneven pattern may not be covered with the soft magnetic layer. The depression portion as used herein indicates a portion between one protrusion portion and another protrusion portion. The uneven pattern is a magnetic transfer pattern that is formed in accordance with the information to be transferred to a slave medium, or that is, a magnetic recording medium. In this description, the uneven pattern formed in accordance with the information to be transferred means a pattern in which a height of the protrusion portion (a depth of the depression portion) is 0.5 µm or less, while the hill and valley that result from the plane deformation of the master carrier 100 means a region in which a height of the hill and a depth of the valley are 1.0 µm or more, respectively.

The master carrier 100 of this embodiment is specifically so designed that the in-plane distance between the hill and the valley of the warped master carrier 100, the vertical-direction distance between the two, and the thickness of the master carrier 100 satisfy a predetermined relation, as will be described in detail hereinunder.

The support 3 of the master carrier is preferably a metal such as nickel or aluminium, but may be formed of any others such as silicon, quartz plate, glass, ceramics or synthetic resin. When the support 3 to form an uneven pattern is made of such a metal, then various metal film-forming methods including electroless plating, electroplating, sputtering or ion-plating may be applied to it. For the magnetic material for the soft magnetic layer 5, employable are Co, Co alloys (e.g., CoNi, CoNiZr, CoNbTaZr), Fe, Fe alloys (e.g., FeCo, FeCoNi, FeNiMo, FeAlSi, FeAl, FeTaN), Ni, Ni alloys (e.g., NiFe). Especially preferred are FeCo and FeCoNi. The soft magnetic layer 5 to be formed on the support 3 is not limited to a soft magnetic material but may also be formed of a semi-hard magnetic material. The magnetic layer formed of a soft magnetic or semi-hard magnetic material having a small coercive force enables better transfer recording. More preferably, the saturation magnetization value of the magnetic layer to be formed on the support 3 is higher than that of the support 3.

The patterned protrusion portion (uneven pattern) of the master carrier 100 may be formed by the use of a stamper or in a mode of photolithography.

A photolithographic patterning method is described below, as one example of the pattern formation.

A photoresist is formed on the smooth surface of a glass plate (or silicone support or quartz plate) in a mode of spin coating thereon. While rotated, the glass plate is exposed to a laser ray (or electron beam) modulated in accordance with a servo signal to thereby make the entire surface of the photoresist have a predetermined pattern. For example, the photoresist is exposed to form a pattern that corresponds to a servo signal linearly extending in every track in the radial direction from the rotation center, in the area that corresponds to each frame on the periphery of the glass support. Next, the photoresist is developed to remove the exposed part. Thus processed, the photoresist on the glass support has an uneven pattern. Next, based on the uneven pattern thereon, the glass support is plated (electroplated) to prepare an Ni support having a positive uneven pattern. The patterned Ni support is then peeled from the glass support. The Ni support may be used directly as a master carrier, or if desired, its uneven pattern may be coated with a soft magnetic layer and a protective film to produce a master carrier.

On the other hand, the glass plate processed to have a photoresist pattern thereon may be etched to form pores in the glass plate and the photoresist may be removed to give a patterned glass support. Then, this may be processed in the same manner as above to produce the intended support.

For the metal material for the support 3, Ni or Ni alloys and the like may be used, as so mentioned hereinabove. For plating the metal base to produce the support 3, various metal film-forming methods including electroless plating, electroplating, sputtering or ion-plating may be employed. Preferably, the height of the protrusion portion of the uneven pattern (depth of uneven pattern) of the support is from 50 to 500 nm, more preferably from 80 to 400 nm. When the uneven pattern is for a sample servo signal, then rectangular protrusion portion that is longer in the radial direction than in the peripheral direction of the support are formed. Concretely, the length of the protrusion portion in the radial direction is preferably from 0.05 to 20 μm, and that in the peripheral direction is preferably from 0.05 to 5 μm. For the pattern to carry information of servo signals, preferred are rectangular protrusion portion having the profile that falls within the range.

To form the soft magnetic layer 5 on the uneven pattern of the support 3, a magnetic material may be applied to the support in a mode of vacuum film formation such as vacuum deposition, sputtering or ion-plating, or though plating. Preferably, the thickness of the soft magnetic layer (on the uneven pattern) is from 50 to 500 nm, more preferably from 80 to 300 nm.

In the master carrier 100, it is desirable that the soft magnetic layer (soft magnetic film) to cover the uneven pattern of the support is protected with a protective film of diamond-like carbon (DLC) or the like having a thickness of from 5 to 30 nm. If further desired, a lubricant layer may be formed on it. Between the soft magnetic layer and the protective film, an adhesiveness-enhancing layer of Si or the like may be provided. While in contact with a slave medium, the master carrier may be incorrectly positioned, and when it is corrected, it may receive friction. The lubricant layer will be effective for preventing the master carrier from being scratched owing to the friction, and will be effective for improving the durability of the master carrier.

When the master carrier is kept in intimate contact with a slave medium, a local stress is generated at a warped region of the master carrier. The local stress is an external stress, which removes the warp. As the result, either or both of the master carrier and the slave medium may be damaged. It is effective to form a protective film as described above to prevent these damages. When the protective film is formed as described above, an increased thickness thereof results in increased durability of the master carrier. However, if the protective film is too thick, then signal recording quality decreases. Accordingly, it is preferred that the thickness of the protective film is about 3 to 30 nm, and more preferably about 5 to 15 nm.

Next described is an embodiment of using the master carrier of the invention for magnetic transfer of information to a slave medium.

As in FIG. 1, a slave medium 7 is put between two master carriers 100 and 200 that are disposed coaxially. The slave medium 7 is, for example, a disc-shaped magnetic recording medium such as hard disc, flexible disc or the like having a magnetic recording layer formed on one or both surfaces thereof. In this embodiment, the slave medium 7 used has in-plane magnetic recording layers 7b and 7c formed on both faces of a disc support 7a.

The master carrier 100 is as in the above-mentioned embodiment, and it has a uneven pattern that corresponds to the lower recording layer 7b of the slave medium 7. The master carrier 200 has the same layer constitution as that of the master carrier 100, and it has a uneven pattern that corresponds to the upper recording layer 7c of the slave medium 7.

In FIG. 1, the magnetic recording medium 7 and the master carriers 100 and 200 are separated from each other. In actual magnetic transfer, the information-reproducing face of the magnetic recording medium 7 is kept in intimate contact with the soft magnetic layer 5, 5 of the master carrier 100, 200, or is kept adjacent to it.

Figure 2A:
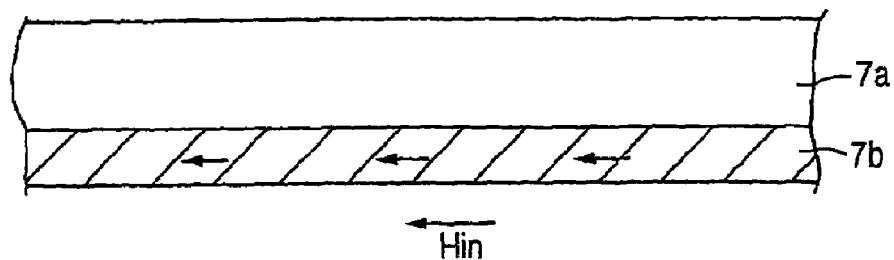
FIG. 2 is explanatory views showing a basic process of magnetic transfer to a magnetic recording medium.
Figure 2B:
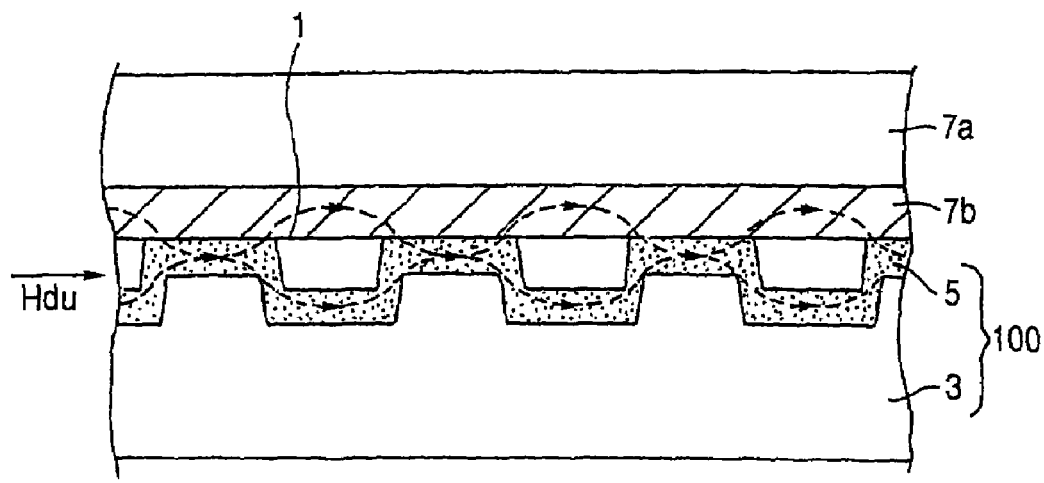
Figure 2C:
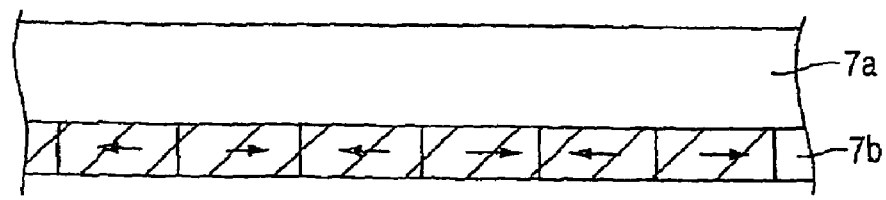
Figure 3:
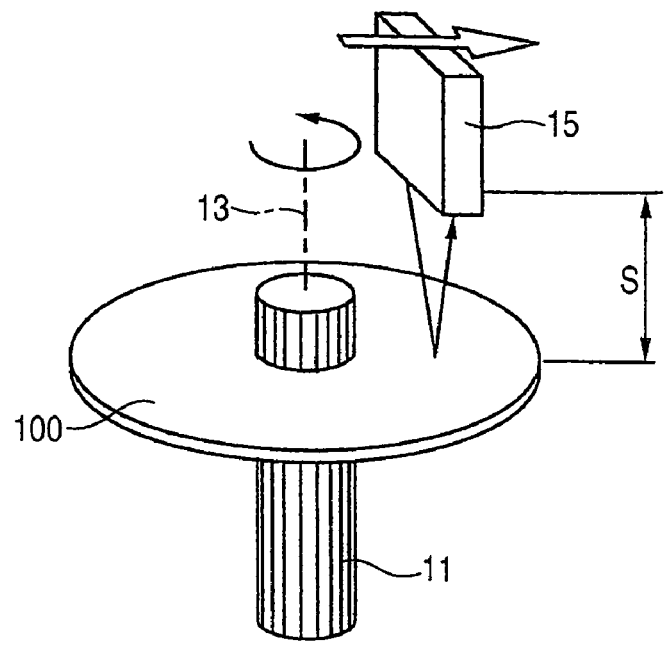
FIG. 3 is an explanatory view schematically showing a method for analyzing the profile of a master carrier.

FIGS. 2a to 2c is explanatory views showing a basic process of magnetic transfer to an in-plane magnetic recording medium. FIG. 2a indicates a step of initial DC magnetization of a slave medium by applying thereto a magnetic field in one direction of the medium; FIG. 2b indicates a step of intimately contacting the slave medium with a master carrier followed by applying a magnetic field thereto in the direction almost oppositely to the direction of the initial DC magnetic field; and FIG. 2c indicates a condition of the information-reproducing face of the slave medium after the step of magnetic transfer thereto. In FIGS. 2a to 2c, only the side of the lower recording layer 7b of the slave medium 7 is shown.

As in FIG. 2(a), an initial DC magnetic field Hin is previously applied to the slave medium 7 in one track direction thereof, and its magnetic recording layer 7b is thereby magnetized for initial DC magnetization. Next, as in FIG. 2(b), the recording layer 7b of the slave medium 7 is kept in intimate contact with the soft magnetic layer 5 on the uneven pattern of the master carrier 100, and a transfer magnetic field Hdu is applied to them in the track direction of the slave medium 7 that is opposite to the direction of the initial DC magnetic field Hin for magnetic transfer between the two in that condition.

As a result, as in FIG. 2(c), the information (e.g., servo signal) that corresponds to the uneven pattern of the master carrier 100 is magnetically transferred to the magnetic recording layer 7b of the slave medium 7. In this, magnetic transfer from the lower master carrier 100 to the lower recording layer 7b of the slave medium 7 is described. Similarly, the upper recording layer 7c of the magnetic recording medium 7 is kept in intimate contact with the upper master carrier 200 for magnetic transfer thereonto. Magnetic transfer to the upper and lower recording layers 7c and 7b of the magnetic recording medium 7 may be effected both at a time or may be effected one by one.

When the uneven pattern of the master carrier 100 is a negative pattern that is opposite to the positive pattern of FIGS. 2a to 2c, then magnetic transfer of the information may also be effected in the same manner as above, except that the direction of the initial magnetic field Hin and the direction of the transfer magnetic filed Hdu are made opposite to the above. The initial DC magnetic field and the transfer magnetic field must be determined, depending on the coercive force of the slave medium and the relative magnetic permeability of the master carrier and the slave medium.

The master carrier 100 of the invention is so designed that the in-plane distance L (mm) between the top of the hill and the bottom of the valley, which result from a warp of the master carrier 100, the vertical-direction distance H (μm) between the two (that is, the top of the hill and the bottom of the valley), and the thickness d (mm) of the master carrier 100 satisfy a relation of:

$$0.05 \leq H \cdot d^3 / L \leq 0.6.$$

The grounds from which the conditional expression was derived are mentioned below.

a) As a result of profile analysis of the master carrier used, minor profile change was found before and after magnetic transfer with it.

b) It was considered that large contact pressure applied to a master carrier and a slave medium would cause deformation of the master carrier, and the contact pressure in carrying out magnetic transfer was reduced. However, good intimate contact between the master carrier and the slave medium could not be attained.

c) Except for the contact pressure, presence of any other factors that may augment master carrier deformation was taken into consideration.

d) The master carrier was thinned to lower the macromechanical bending toughness thereof. However, the contact pressure necessary for ensuring uniform intimate contact between master carrier and recording medium did not differ so much between the thick master carrier and the thin master carrier.

Based on the above, master carriers were analyzed in more detail in relation to the signals written thereon. As a result, it has been clarified that the microscopic initial deformation of master carriers significantly depends on the contact pressure applied to master carriers. In particular, it has been found that, when a master carrier to have a predetermined uneven pattern is specifically so designed that the in-plane distance L (mm) between the top of the hill and the bottom of the valley of the warped master carrier, the vertical-direction distance H (μm) between the two, and the thickness d (mm) of the master carrier satisfy a relation of:

$$0.05 \leq H \cdot d^3 / L \leq 0.6,$$

then it ensures uniform and intimate contact with a slave medium attached thereto and it is prevented from being deformed and deteriorated under contact pressure.

In the above, the term $d^3$ is a proportional term of the cross-section coefficient of the master carrier and it indicates the bending strength of the master carrier; the term H indicates the amplification component of the undulation of the warped master carrier; and the term L indicates the distance between the top of the hill and the bottom of the valley of the warped master carrier. Accordingly, the degree of in-plane deformation of the master carrier 100 is proportional to the term $d^3$ and the term H and is inversely proportional to the term L.

The master carrier 100 that is so constituted as to satisfy the above-mentioned condition is free from deformation that is augmented dependently on the contact pressure applied thereto and, as a result, it ensures uniform and intimate contact with a slave medium applied thereto with no problem of its deformation, and therefore it is free from deterioration to be caused by the contact pressure-dependent deformation thereof. Accordingly, the master carrier realizes improved magnetic transfer quality and uniform signal recording in the entire area of discs. Specifically, when the master carrier 100 is so designed as to satisfy the above-mentioned condition, then its initial deformation may be retarded. Accordingly, the advantage of the master carrier is that, in its actual production, it may be prevented from being deformed under contact pressure applied thereto.

Next described is an inspection method for selecting the master carrier 100 that satisfies the above-mentioned condition. Of all produced, only the master carrier 100 that satisfies the above-mentioned condition is selected, and those not satisfying the condition are discarded.

One embodiment of the inspection method is in FIG. 3. As illustrated, a master carrier 100 held by the rotary shaft 11 of a rotary mechanism is rotated around the center axis 13 thereof by means of a rotary driving device such as motor or the like (not shown). On the other hand, an optical length-measuring device, for example, a laser displacement gauge (e.g., Keyence's C-2430) is disposed opposite to the face to be analyzed of the master carrier 100. On a uniaxial stage, the detector 15 of the device is moved in the radial direction of the master carrier 100 while kept in parallel to the face of the mater carrier 100. Accordingly, the detector 15 scans the entire face to be analyzed of the master carrier 100, and measures the distance S at every coordinate point determined in a predetermined density on the master carrier face.

One example of controlling the scanning operation is described. The master carrier 100 is rotated at an angular speed of 10 rpm or so, and the displacement (distance S) for one peripheral circle of the master carrier 100 is measured at divided 512 points/peripheral circle. Next, on a uniaxial stage, the detector 15 of the laser displacement gauge is moved by 0.5 mm in the radial direction of the master carrier 100. With that, the distance S is measured in the same manner as previously but in the radial position that differs from the radial position at which the distance S was measured previously. This measurement mode is repeated, and the data of the distance S thus measured in the range of from 15 mm to 41.5 mm in the radial direction of the master carrier 100 are collected.

In that manner, the distance S of the master carrier 100 is determined by scanning it both in the peripheral direction and in the radial direction thereof, and the overall profile deformation of the master carrier 100 can be determined. Specifically, the collected data of the distance S are inputted into the memory of a computer, and the vertical height distribution can be computed from them with reference to the data of the disc profile of the master carrier 100.

Figure 4:
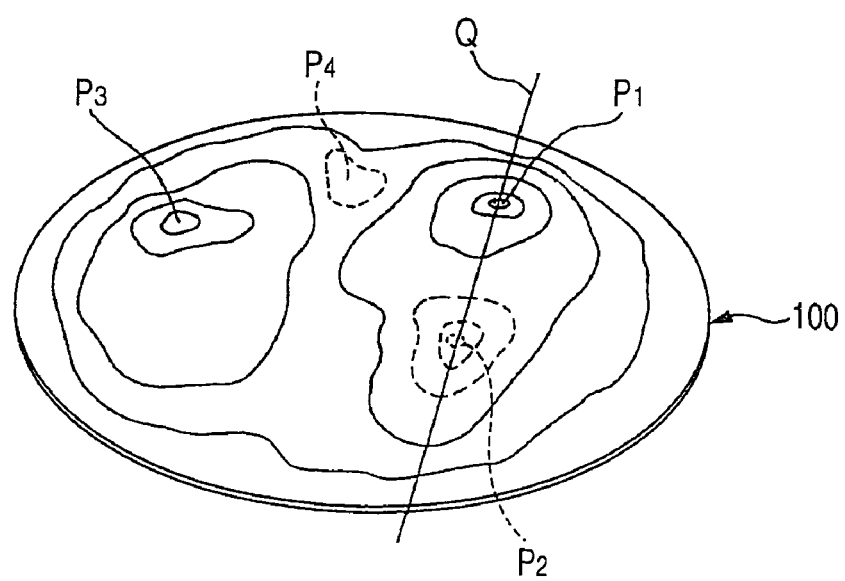
FIG. 4 is an explanatory view showing one example of a deformation profile of the analyzed face of a disc, and it shows contour lines drawn on the basis of the measured data of distance S.
Figure 5:
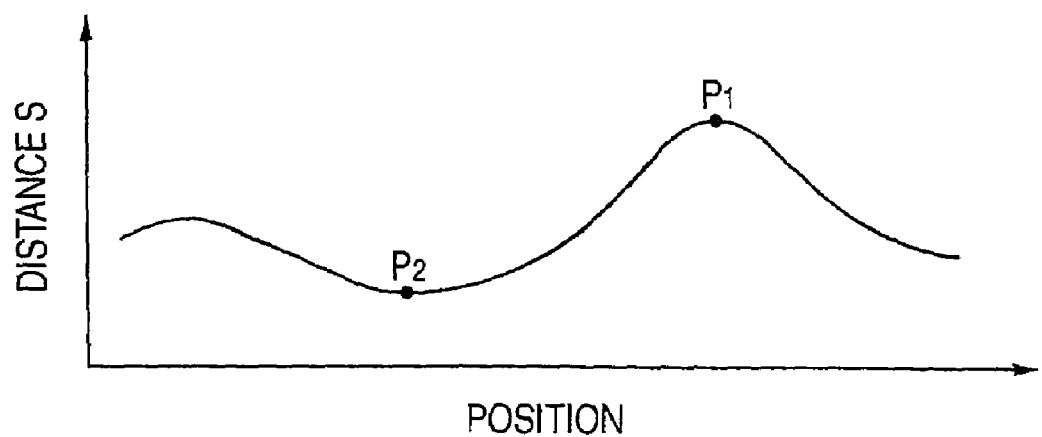
FIG. 5 is a graph showing the change of the distance S on the linear line Q drawn in FIG. 4.

FIG. 4 is an explanatory view showing one example of a deformation profile of the analyzed face of a disc, and it shows contour lines drawn on the basis of the measured data of the distances. FIG. 5 is a graph showing the change of the distance S on the linear line Q drawn in FIG. 4.

Of the contour lines in FIG. 4, the full lines indicate projected hills and the dotted lines indicate recessed valleys. According to the thus-measured data, it is understood that the master carrier 100 has projected hills P1 and P3 and recessed valleys P2 and P4 both caused by the undulation of the warped face of the master carrier 100. Of those hills and valleys, P1 and P2 are a combination of the hill and the valley that are adjacent to each other and have a maximum amplitude width in the height direction. The height profile of the carrier face on the linear line Q drawn by connecting these P1 and P2 is as in FIG. 5 that indicates the height distribution profile.

Figure 6:
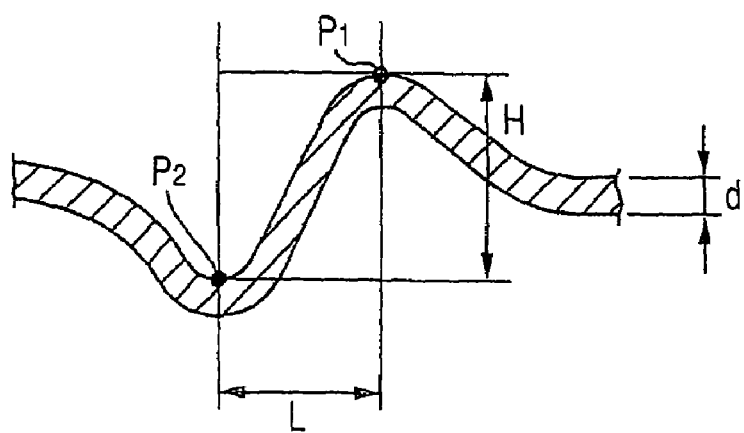
FIG. 6 is a schematic cross-sectional view of a master carrier, in which the undulation at positions P1 and P2 are graphically emphasized.

FIG. 6 is a schematic cross-sectional view of the master carrier 100, in which the undulation at the positions P1 and P2 are graphically emphasized.

The above-mentioned hill P1 and valley P2 are detected, and the position of maximum deformation of the analyzed carrier face is known from it. Then, the in-plane distance L between the hill P1 and the valley P2, and the vertical-direction distance H between the two are thus obtained from it. These data are combined with the known thickness d of the master carrier, and from these, the master carrier is judged whether or not it satisfies the relation of the above-mentioned conditional expression ($0.05 \leq H \cdot d^3/L \leq 0.6$). Based on this, therefore the thus-analyzed master carrier may be judged whether it is good or not.

According to the inspection method, the rotating mechanism of the master carrier 100 and the linear-moving mechanism of the optical length-measuring device are driven to measure the in-plane distance L and the vertical-direction distance H of the warp existing in the master carrier 100, and the overall surface of the master carrier 100 can be scanned by such simple mechanisms. Accordingly, the inspection method enables rapid and accurate detection of the warp deformation of master carriers by the use of inexpensive devices.

When the master carrier 100 that was judged good according to the inspection method is used in recording a servo signal on a magnetic recording medium, then the mater carrier is free from a trouble of deformation that may be augmented dependently on the contact pressure applied thereto and, as a result, the master carrier can be uniformly and intimately contacted with the magnetic transfer medium. According to the production method, therefore, a magnetic recording medium with signals uniformly recorded thereon can be obtained.

EXAMPLES

The master carrier of the invention was evaluated in point of the intimate contact condition thereof with a slave medium and of the durability thereof.

Example 1

(1) Master Carrier:

On the surface of a master carrier, a radial line was formed in the radial region of from 20 mm to 40 mm in the radial direction from the center thereof. The bit length of the radial line was 0.1 µm, the track width was 1.0 µm, the track pitch was 1.1 µm and the uneven depth was 0.1 µm.

For producing the master, a stamper was used. The stamper is formed of Ni, and it serves as a soft magnetic layer for improving magnetic flux absorption. A soft magnetic layer of FeCo (Fe 75 at %, Co 25 at %) was formed on the Ni master at 25° C. The Ar sputtering pressure was 0.15 Pa (1.08 mTorr). The power for sputtering was 2.80 W/cm². The Ni base has a thickness of 0.3 mm, and has a warp of H=60 µm and L=20 mm.

(2) Slave Medium:

On the other hand, a vacuum film-forming device (Shibaura Mechatronics' sputtering device, S-50S) was degassed to a reduced pressure of $1.33 \times 10^{-5}$ Pa ($1.0 \times 10^{-7}$ Torr) at room temperature, and argon was introduced thereinto to a pressure of 0.4 Pa (3.0 mTorr). In this, a glass sheet was heated at 200° C. and worked into a 3.5-inch disc-shaped magnetic recording medium having 30-nm CrTi and 30-nm CoCrPt and having a saturation magnetization Ms of 5.7 T (4500 Gauss) and a coercive force Hc of 199 kA/m (2500 Oe). This serves as a slave medium.

(3) Method of Evaluation of Master/Slave Intimate Contact Condition and Durability:

The master carrier was combined with the slave medium under a varying contact pressure of $2.5 \times 10^{-3}$ Pa (2.5 kgf/cm²), $4.9 \times 10^{-3}$ Pa (5.0 kgf/cm²), $7.4 \times 10^{-3}$ Pa (7.5 kgf/cm²) or $9.9 \times 10^{-3}$ Pa (10 kgf/cm²). The contact pressure for the two was varied from the lower value, and the two were combined under every contact pressure to produce transferred media.

The magnetic transfer medium of the thus-processed slave medium was fitted to an electromagnetic conversion characteristic analyzer (Kyodo Electronics' SS-60), and its linear speed at a radius of 40 mm was set at 10 m/sec. In the analyzer, the head was a GMR head having a reproducing head gap of 0.15 µm, a reproducing track width of 0.41 µm, a recording head gap of 0.19 µm and a recording track width of 0.45 µm.

Thus set in the analyzer, the magnetic transfer medium was tested at regular step intervals of 5 mm within a radial range of from 20 to 40 mm to measure the round-average output (TAA) and the modulation thereof.

When the magnetically-recorded signal is reproduced with the head as above, then the recorded medium gives plus & minus outputs that correspond to the recorded pattern period. The TAA output as referred to herein means a value that is obtained by averaging the plus-minus output peak differences in one round circle. When the medium analyzed has a silence region with no signal therein, then the plus-minus peaks for noises are detected and averaged, and therefore the medium has a small TAA output value.

The modulation (modulation output) is defined as follows, when the reproduction output in one round circle (TAA output) varies.

Modulation=(maximum output−minimum output)/(maximum output+minimum output)×100.

Accordingly, a smaller modulation indicates a uniform output with no difference between the maximum output and the minimum output. On the other hand, a larger modulation means a larger difference between the maximum output and the minimum output, or that is, it indicates a pattern having a reduced output region.

In the test method for evaluation of contact condition, when the modulation value is smaller than 10%, then the master carrier is kept in good contact with the slave medium under the lowermost contact pressure, and the contact condition of the two is judged good.

Regarding the durability, 100 sheets of the slave medium that had been contacted with the master carrier under the lowermost contact pressure were tested for the reproduction output and the modulation thereof. Briefly, the mean output and modulation of the magnetic transfer medium that had been measured in the first time at every radial position were defined as standard values. When the mean output of the 100th slave medium is at least 90% of the standard value, and when the modulation change thereof is within 5% of the standard value, then the slave medium was judged good. The others overstepping the range relative to the standard values were judged NG (not good). When the modulation value is 10% or more, then the contact pressure is increased and the same test is repeated.

Various types of the master carrier 100 were tested in point of the above-mentioned intimate contact condition and durability. The master carrier samples of Examples 2 to 6 differ from the sample of Example 1 in point of the in-plane distance L, the vertical-direction distance H and the master thickness d. The master carrier sample of Example 7 differs from the sample of Example 1 in point of having a sputter-carbon protective film of 5 nm on the surface of the master carrier. In addition, the master carrier sample of Example 8 differs from the sample of Example 1 in point of having a sputter-carbon protective film of 30 nm on the surface of the master carrier. Furthermore, the master carrier sample of Example 9 differs from the sample of Example 1 in point of having a sputter-carbon protective film of 35 nm on the surface of the master carrier. Those of Comparative Examples 1 and 2 are without the scope of the invention in point of the relation of these L, H and d. The test results are given in Table 1.

TABLE 1

|  | in-plane distance L (mm) | vertical-direction distance H (μm) | master thickness d (mm) | $H \cdot d^3 / L$ | Contact Condition | | | Durability | | | |
|---|---|---|---|---|---|---|---|---|---|---|---|
|  |  |  |  |  | contact pressure (Pa) | Modulation (%) | Evaluation | TAA Output (%) | Evaluation | Modulation (%) | Evaluation |
| Example 1 | 22 | 62.00 | 0.3 | 0.08 | $2.5 \times 10^{-3}$ | 5 | good | 98 | good | 1 | good |
| Example 2 | 8 | 59.40 | 0.3 | 0.20 | $2.5 \times 10^{-3}$ | 4 | good | 97 | good | 2 | good |
| Example 3 | 4.5 | 55.00 | 0.3 | 0.33 | $2.5 \times 10^{-3}$ | 4 | good | 99 | good | 4 | good |
| Example 4 | 0.6 | 9.40 | 0.3 | 0.42 | $5.0 \times 10^{-3}$ | 5 | good | 96 | good | 2 | good |
| Example 5 | 0.4 | 4.60 | 0.3 | 0.31 | $5.0 \times 10^{-3}$ | 8 | good | 97 | good | 1 | good |
| Example 6 | 0.5 | 3.80 | 0.2 | 0.06 | $2.5 \times 10^{-3}$ | 3 | good | 99 | good | 4 | good |
| Example 7 | 22 | 62.00 | 0.3 | 0.08 | $2.5 \times 10^{-3}$ | 3 | good | 96 | good | 4 | good |
| Example 8 | 22 | 62.00 | 0.3 | 0.08 | $2.5 \times 10^{-3}$ | 5 | good | 95 | good | 3 | good |
| Example 9 | 22 | 62.00 | 0.3 | 0.08 | $2.5 \times 10^{-3}$ | 9 | good | 90 | good | 8 | good |
| Comparative Example 1 | 19 | 61.20 | 0.6 | 0.70 | $9.9 \times 10^{-3}$ | 15 | not good | — | — | — | — |
| Comparative Example 2 | 0.3 | 4.90 | 0.1 | 0.02 | $2.5 \times 10^{-3}$ | 3 | good | 75 | not good | 6 | not good |

As in Table 1, the master carriers of Examples 1 to 9 all satisfy the condition of $0.05 \leq H \cdot d^3/L \leq 0.6$, and the slave media that had been magnetically transferred from these master carriers were all good in point of the contact condition thereof with the master carrier and the durability thereof. On the other hand, however, the master carriers of Comparative Examples 1 and 2 not satisfying the condition were not good. Concretely, the master carrier of Comparative Example 1 was not good in point of the contact condition thereof with a slave medium; and the master carriers of Comparative Examples 1 and 2 were both not good in point of the durability thereof.

The present invention is not limited to the specific above-described embodiments. It is contemplated that numerous modifications may be made to the present invention without departing from the spirit and scope of the invention as defined in the following claims.

The present invention claims foreign priority based on Japanese Patent application no. 2003-277561, filed on Jul. 22, 2003, the contents of which is incorporated herein by reference.

What is claimed is:

1. A process of producing a preformatted magnetic recording medium, which comprises the steps of:
    preparing a master carrier for magnetic transfer,
    preparing a slave medium comprising a non-magnetic support having a magnetic recording layer thereon,
    initially magnetizing said magnetic recording layer of said slave medium to a predetermined direction,
    bringing a surface of said master medium into intimate contact with said magnetic recording layer of said slave medium at a predetermined pressure to form a conjoined body, and
    applying a transfer magnetic field to said conjoined body in a direction opposite to said predetermined direction, thereby obtaining said magnetic recording medium having said recorded data,
    wherein said master carrier comprises a disk surface having a hill and a valley, which result from a warp of said master carrier; said master carrier has an in-plane distance L (mm) between top of the said hill and bottom of the said valley with respect to said disk surface, a vertical-direction distance H (μm) between said hill and said valley with respect to said disk surface, and a thickness d (mm); and said in-plane distance L (mm), said vertical-direction distance H (μm), and said thickness d (mm) satisfy the following formula:

$0.05 \leq H \cdot d^3/L \leq 0.6$

2. The process of producing a preformatted magnetic recording medium as claimed in claim 1, wherein said support to form the transfer-recording pattern comprises a metal.

3. The process of producing a preformatted magnetic recording medium as claimed in claim 1, wherein said metal comprises at least one of Ni and Al.

4. The process of producing a preformatted magnetic recording medium as claimed in claim 1, which further comprises a protective film on said support.

5. The process of producing a preformatted magnetic recording medium as claimed in claim 1, wherein said master carrier further comprises a soft magnetic film on a surface of said master carrier.

6. The process of producing a preformatted magnetic recording medium as claimed in claim 4, wherein said protective film has a thickness of 3 to 30 nm.

7. The process of producing a preformatted magnetic recording medium as claimed in claim 5, wherein said soft magnetic film has a thickness of 50 to 500 nm.

8. The process of producing a preformatted magnetic recording medium as claimed in claim 5, wherein said master carrier further comprises a protective film on said soft magnetic film.

* * * * *